US010175859B2

(12) United States Patent
Iwasaki

(10) Patent No.: US 10,175,859 B2
(45) Date of Patent: Jan. 8, 2019

(54) METHOD FOR DOCUMENT NAVIGATION USING A SINGLE-PAGE GESTURE AND A GESTURE FOR SETTING AND MAINTAINING A NUMBER OF PAGES TURNED BY SUBSEQUENT GESTURES

(71) Applicant: FUJI XEROX CO., LTD., Tokyo (JP)

(72) Inventor: Yasuhiko Iwasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 111 days.

(21) Appl. No.: 14/659,075

(22) Filed: Mar. 16, 2015

(65) Prior Publication Data

US 2015/0355796 A1     Dec. 10, 2015

(30) Foreign Application Priority Data

Jun. 4, 2014   (JP) .................................. 2014-115456

(51) Int. Cl.
*G06F 3/0483*     (2013.01)
*G06F 3/0488*     (2013.01)

(52) U.S. Cl.
CPC .......... *G06F 3/0483* (2013.01); *G06F 3/0488* (2013.01)

(58) Field of Classification Search
CPC .............................. G06F 3/0483; G06F 3/0488
See application file for complete search history.

(56) References Cited

U.S. PATENT DOCUMENTS

| 5,463,725 A * | 10/1995 | Henckel ................ G06F 3/0483 345/473 |
| 8,593,408 B2 * | 11/2013 | Ryu ....................... G06F 3/0483 345/173 |

(Continued)

FOREIGN PATENT DOCUMENTS

| JP | 2000242390 A | 9/2000 |
| JP | 2000259315 A | 9/2000 |

(Continued)

OTHER PUBLICATIONS

Feb. 20, 2018 Office Action issued in Japanese Patent Application No. 2014-115456.

(Continued)

*Primary Examiner* — Abdullah Al Kawsar
*Assistant Examiner* — Jeremy L Stanley
(74) *Attorney, Agent, or Firm* — Oliff PLC

(57) ABSTRACT

An information processing apparatus includes a screen, a receiving unit that receives an operation performed on the screen, a display that displays a document having multiple pages on the screen on a page-by-page basis, a processing mode changing unit that, upon detecting a predetermined first operation on the document displayed on the screen, changes from a first processing mode that moves one page at a time to a second processing mode that moves multiple pages, and a moving unit that, upon detecting a predetermined second operation in the second processing mode, moves multiple pages within the document. As the predetermined first operation, the processing mode changing unit detects continued detection of a first position where a drag operation has ended, or detects, while the first position is detected, an operation performed at a second position different from the first position.

9 Claims, 12 Drawing Sheets

(56) References Cited

U.S. PATENT DOCUMENTS

| | | | |
|---|---|---|---|
| 2001/0024195 A1* | 9/2001 | Hayakawa | G06F 3/04847 345/173 |
| 2010/0141605 A1* | 6/2010 | Kang | G06F 1/1626 345/174 |
| 2011/0209039 A1* | 8/2011 | Hinckley | G06F 3/04883 715/206 |
| 2011/0296334 A1* | 12/2011 | Ryu | G06F 3/0483 715/776 |
| 2012/0069056 A1* | 3/2012 | Ito | G06F 3/0483 345/684 |
| 2012/0084647 A1* | 4/2012 | Homma | G06F 3/0483 715/273 |
| 2012/0084702 A1* | 4/2012 | Lee | G06F 3/04883 715/776 |
| 2012/0127109 A1* | 5/2012 | Nishio | G06F 3/04883 345/173 |
| 2013/0055140 A1* | 2/2013 | Mosquera | G06F 3/0483 715/776 |
| 2013/0104017 A1* | 4/2013 | Ko | G06F 3/0483 715/205 |
| 2013/0117703 A1* | 5/2013 | Jang | G06F 3/04883 715/776 |
| 2013/0120302 A1* | 5/2013 | Kang | G06F 3/041 345/173 |
| 2013/0145307 A1* | 6/2013 | Kawasaki | G06F 3/04886 715/781 |
| 2013/0169563 A1* | 7/2013 | Sotoike | G06F 3/0488 345/173 |
| 2013/0198678 A1* | 8/2013 | Lee | G06F 3/0488 715/776 |
| 2013/0229358 A1* | 9/2013 | Hamilton, II | G06F 1/1626 345/173 |
| 2013/0232439 A1* | 9/2013 | Lee | G06F 3/0488 715/776 |
| 2013/0268847 A1* | 10/2013 | Kim | G06F 3/0488 715/251 |
| 2014/0059474 A1* | 2/2014 | Cho | G06F 3/0488 715/776 |
| 2014/0149905 A1* | 5/2014 | Woo | G06F 3/0485 715/768 |
| 2014/0168077 A1* | 6/2014 | Hicks | G06F 3/04883 345/157 |
| 2014/0173482 A1* | 6/2014 | Hicks | G06F 3/0483 715/769 |
| 2014/0250391 A1* | 9/2014 | Jong | G06F 3/0483 715/763 |
| 2014/0281954 A1* | 9/2014 | Ullrich | G06F 15/0291 715/702 |
| 2014/0337787 A1* | 11/2014 | O'Donoghue | G06F 3/04883 715/776 |
| 2014/0362016 A1* | 12/2014 | Matsuki | G06F 3/041 345/173 |
| 2014/0380247 A1* | 12/2014 | Tecarro | G06F 3/0483 715/863 |
| 2015/0035800 A1* | 2/2015 | Uchiyama | G06F 3/0421 345/175 |
| 2015/0234786 A1* | 8/2015 | Landau | G06F 3/0488 715/201 |
| 2015/0242074 A1* | 8/2015 | Iwamoto | G06F 3/0483 345/158 |
| 2015/0355798 A1* | 12/2015 | Kinehara | G06F 3/0488 715/776 |
| 2016/0018965 A1* | 1/2016 | Park | G06F 3/0486 715/769 |

FOREIGN PATENT DOCUMENTS

| | | |
|---|---|---|
| JP | 2003157134 A | 5/2003 |
| JP | 2011039843 A | 2/2011 |
| JP | 2012064092 A | 3/2012 |
| JP | 2012079156 A | 4/2012 |
| JP | 2012079301 A | 4/2012 |
| JP | 2012079302 A | 4/2012 |
| JP | 2012079315 A | 4/2012 |
| JP | 2012088801 A | 5/2012 |
| JP | 2013-117791 A | 6/2013 |

OTHER PUBLICATIONS

Jun. 12, 2018 Office Action issued in Japanese Patent Application No. 2014-115456.

\* cited by examiner

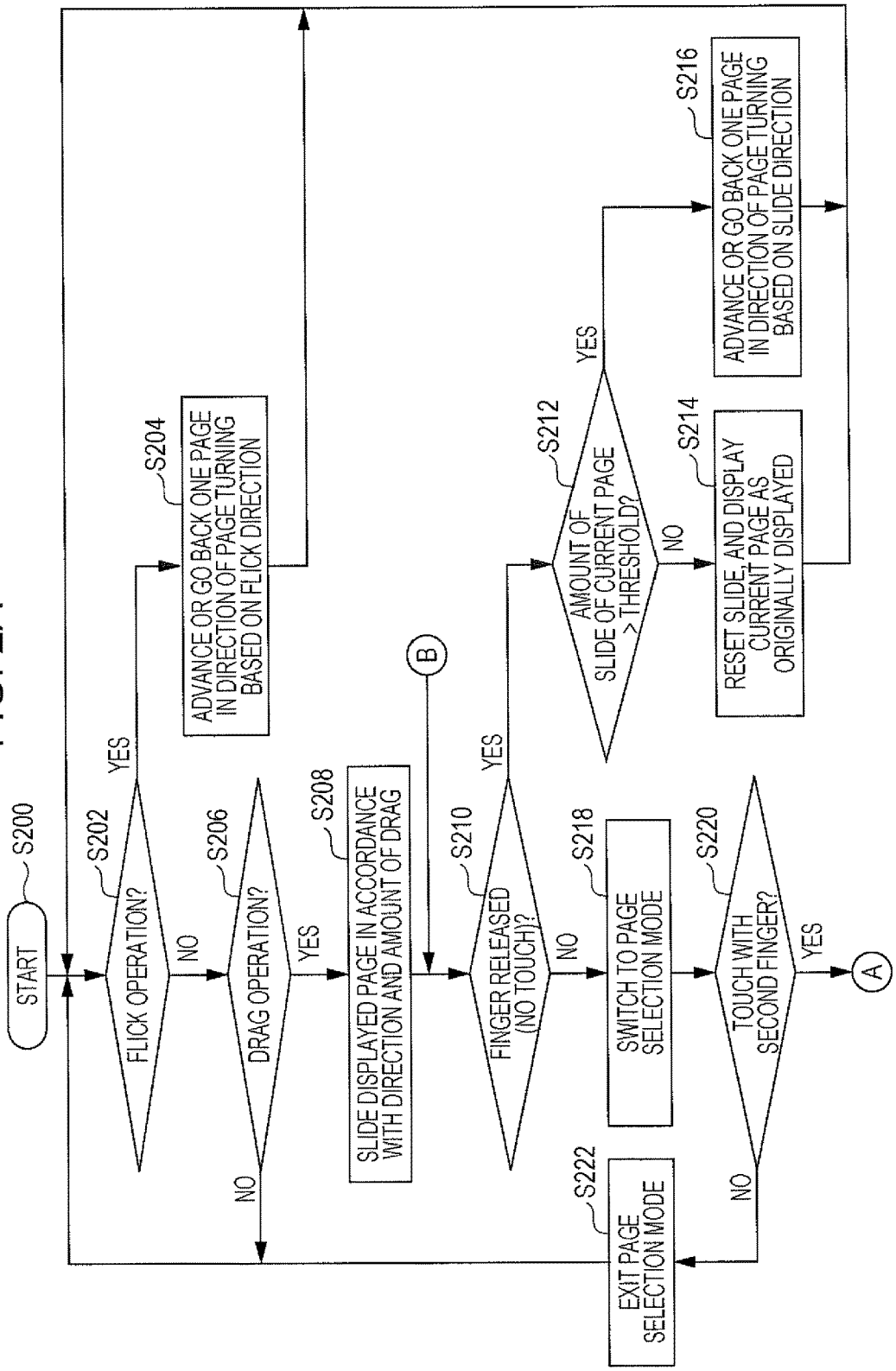

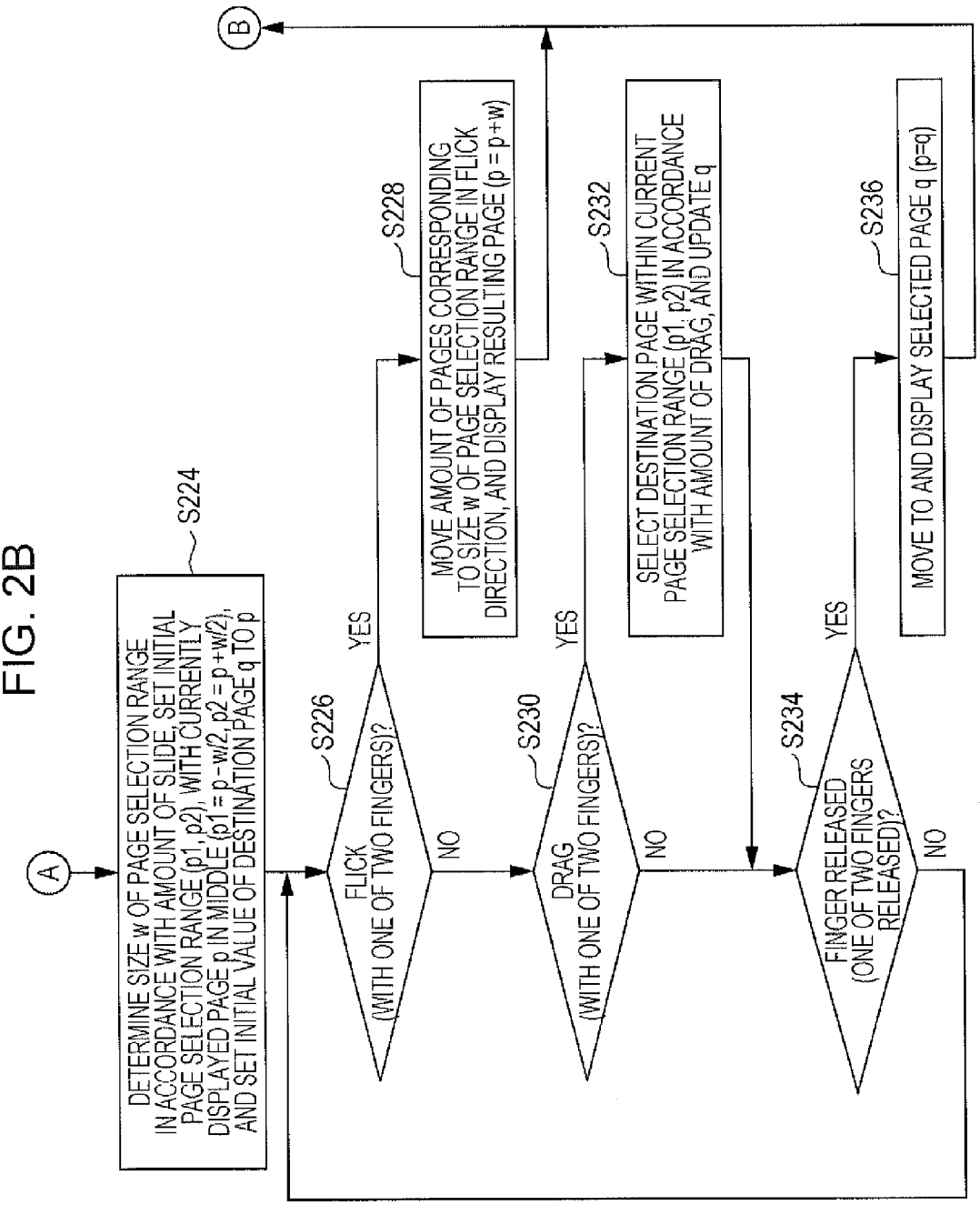

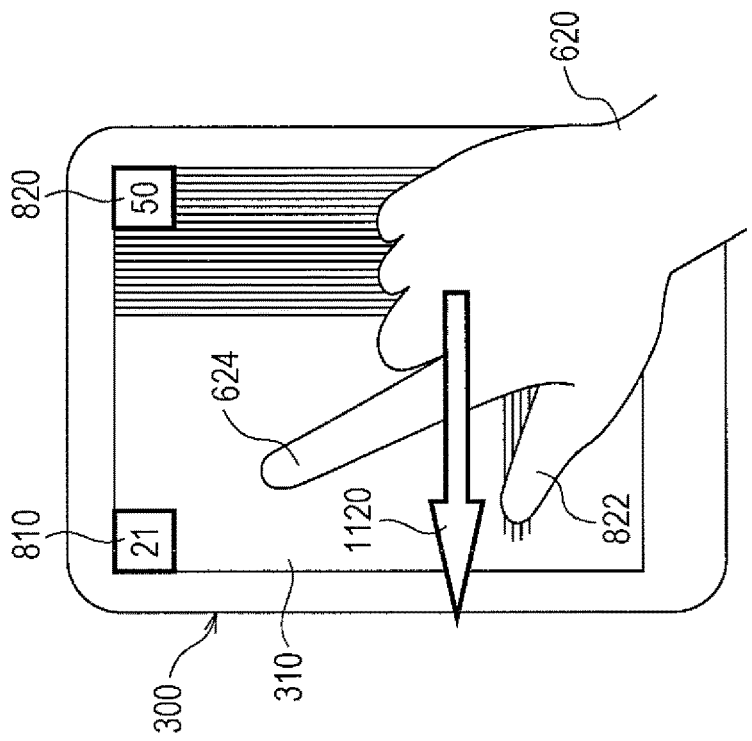
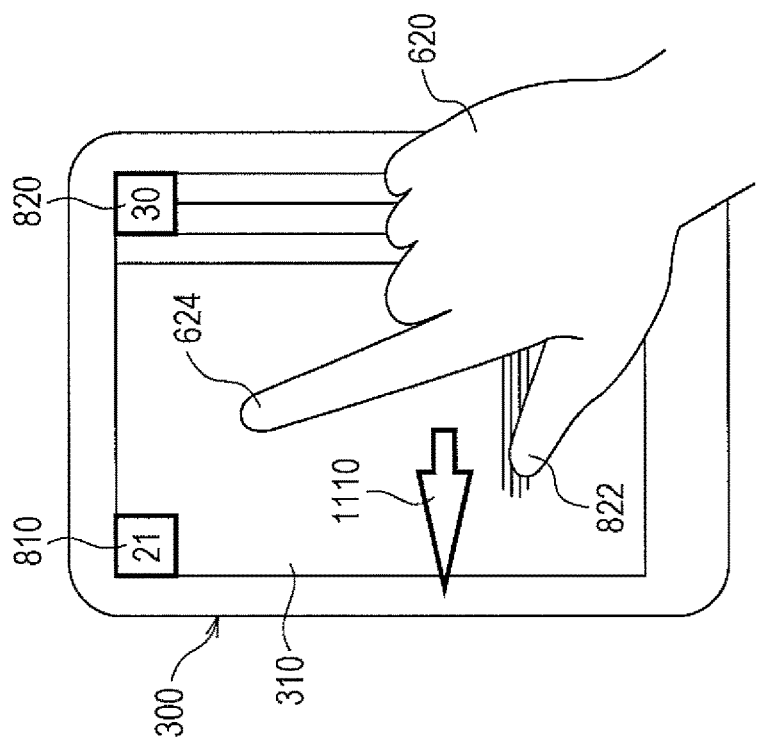

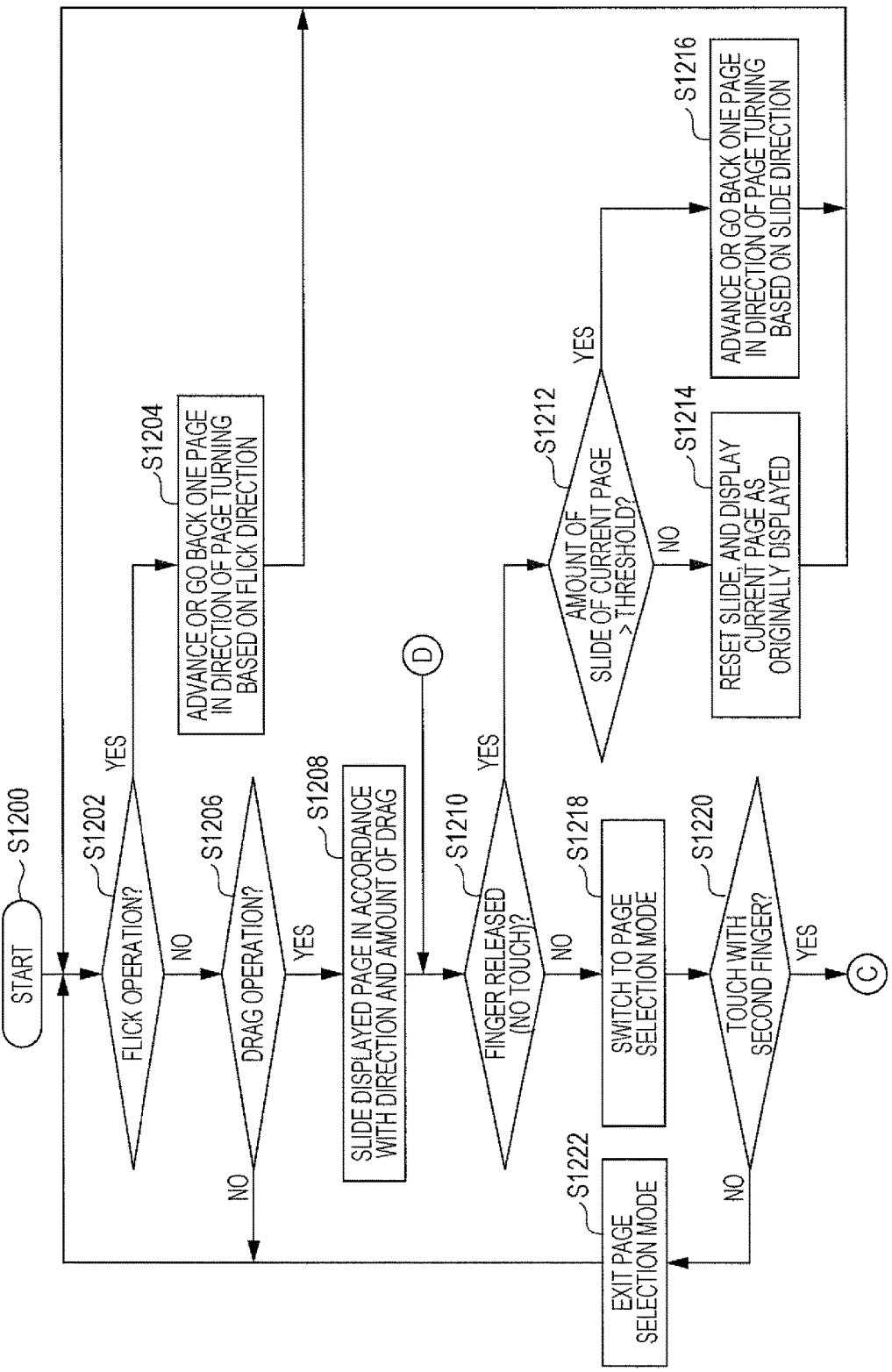

METHOD FOR DOCUMENT NAVIGATION USING A SINGLE-PAGE GESTURE AND A GESTURE FOR SETTING AND MAINTAINING A NUMBER OF PAGES TURNED BY SUBSEQUENT GESTURES

CROSS-REFERENCE TO RELATED APPLICATIONS

This application is based on and claims priority under 35 USC 119 from Japanese Patent Application No. 2014-115456 filed Jun. 4, 2014.

BACKGROUND

The present invention relates to information processing apparatus, a non-transitory computer readable storage medium, and an information processing method.

SUMMARY

According to an aspect of the invention, there is provided an information processing apparatus including a screen, a receiving unit that receives an operation performed on the screen, a display that displays a document having multiple pages on the screen on a page-by-page basis, a processing mode changing unit that, upon detecting a predetermined first operation on the document displayed on the screen, changes from a first processing mode that moves one page at a time to a second processing mode that moves multiple pages, and a moving unit that, upon detecting a predetermined second operation in the second processing mode, moves multiple pages within the document. As the predetermined first operation, the processing mode changing unit detects continued detection of a first position where a drag operation has ended, or detects, while the first position is detected, an operation performed at a second position different from the first position.

BRIEF DESCRIPTION OF THE DRAWINGS

Exemplary embodiment of the present invention will be described in detail based on the following figures, wherein:

FIGS. 2A and 2B are flowcharts illustrating an example of processing according to the exemplary embodiment;

FIGS. 11A and 11B each illustrate an example of processing according to the exemplary embodiment;

FIGS. 12A and 12B are flowcharts illustrating an example of processing according to the exemplary embodiment.

DETAILED DESCRIPTION

Hereinafter, an exemplary embodiment of the present invention will be described with reference to the figures.

Figure 1:
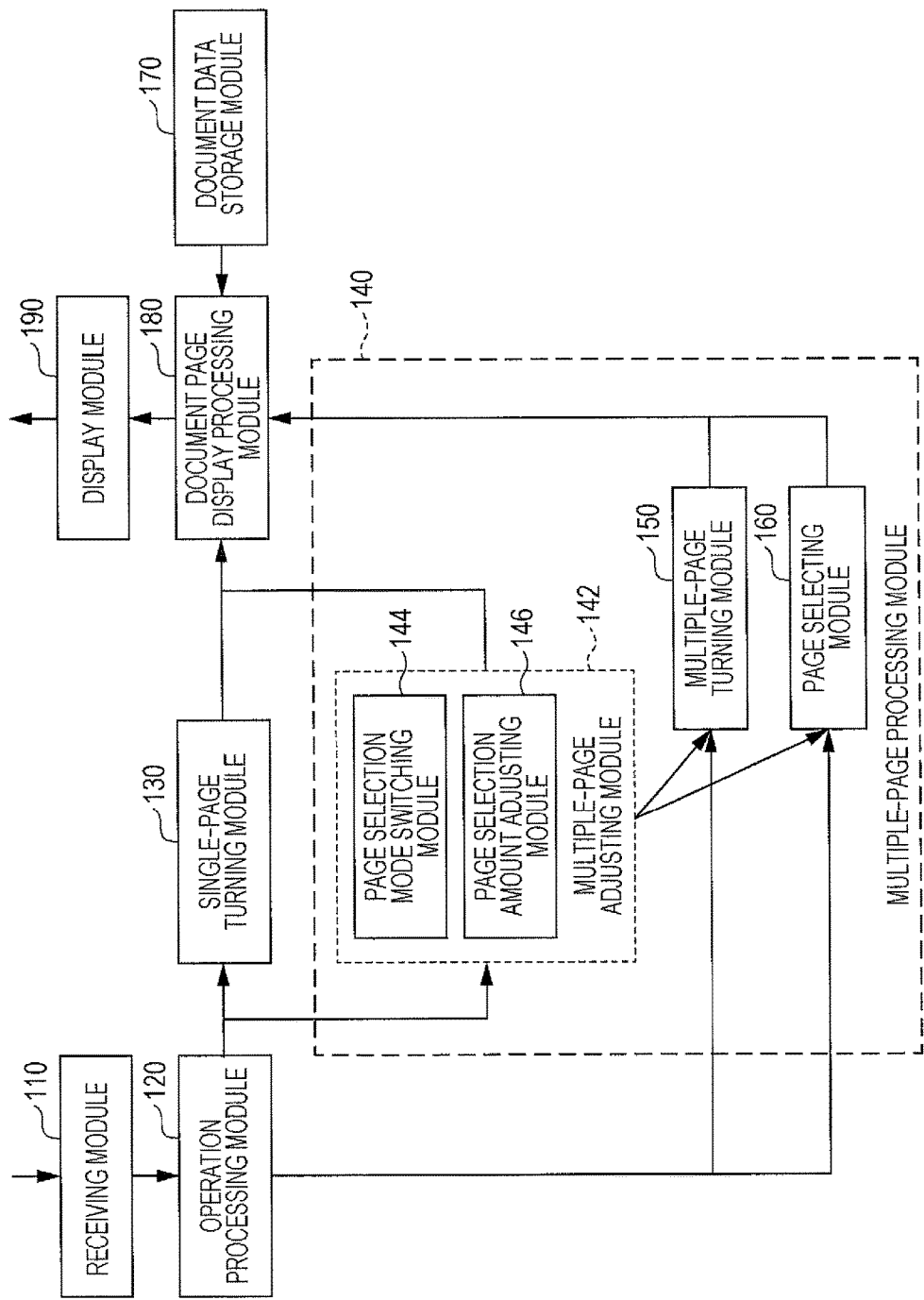
FIG. 1 is a conceptual module diagram of an example of configuration according to the exemplary embodiment.

FIG. 1 is a conceptual module diagram of an example of configuration according to the exemplary embodiment.

The term "module" generally refers to a logically separable component of software (computer program), hardware, or the like. Therefore, the term "module" as used in the exemplary embodiment refers to not only a module in a computer program but also a module in a hardware configuration. Thus, the exemplary embodiment will be also described in the context of a computer program for providing functions of modules (a program for causing a computer to execute individual procedures, a program for causing a computer to function as individual units, and a program for causing a computer to realize individual functions), a system, and a method. While "store", "be stored", and equivalent expressions are used herein for the convenience of description, these expressions mean, when an exemplary embodiment relates to a computer program, "cause a memory to store" or "perform control so as to cause a memory to store." While individual modules and functions may have a one-to-one correspondence, in actual implementation, a single module may be implemented by a single program, or multiple modules may be implemented by a single program. Conversely, a single module may be implemented by multiple programs. Further, multiple modules may be executed by a single computer, or a single module may be executed by multiple computers that are in a distributed or parallel environment. A single module may include another module. In the following description, the term "connection" refers to not only a physical connection but also a logical connection (such as exchanging of data, issuing of an instruction, and cross-reference between data items). The term "predetermined" as used herein means being determined prior to a process of interest, which not only means being determined before processing according to the exemplary embodiment begins but also being determined, even after the processing according to the exemplary embodiment begins, at any point in time preceding a process of interest in accordance with the condition/state at that point in time, or in accordance with the condition/state up to that point in time. If multiple "predetermined values" exist, each of these values may be different, or two or more of these values may be the same (which includes, of course, cases where all of these values are the same). Further, expressions that have the meaning of "if A, then B" is used to mean that "it is determined whether A, and then B if it is determined that A", unless it is not required to determine whether A.

Furthermore, the term "system" or "apparatus" includes not only cases where a system or apparatus is made up of multiple computers, hardware components, devices, or the like that are connected to each other via a communication medium such as a network (including a one-to-one communication setup), but also cases where a system or apparatus is implemented by a single computer, hardware component, or device. The terms "apparatus" and "system" are herein used synonymously. As a matter of course, the term "system" does not include what is merely a social "mechanism" (social system) which is a man-made arrangement of rules.

Further, for each process executed by each module or, if multiple processes are to be executed within a module, for each of the multiple processes, information of interest is read from a memory, and after execution of the corresponding process, the results of processing are written into the memory. Therefore, a description about reading of information from a memory prior to a process, or writing of information into a memory after a process will sometimes be omitted. The term "memory" as used herein may include a hard disk, a random access memory (RAM), an external storage medium, a memory using a communication line, and a register in a central processing unit (CPU).

An information processing apparatus according to the exemplary embodiment displays a document. As illustrated in FIG. 1, the information processing apparatus has a receiving module 110, an operation processing module 120, a single-page turning module 130, a multiple-page processing module 140, a document data storage module 170, a document page display processing module 180, and a display module 190. The multiple-page processing module 140 has a multiple-page adjusting module 142, a multiple-page turning module 150, and a page selecting module 160. The multiple-page adjusting module 142 has a page selection mode switching module 144, and a page selection amount adjusting module 146. This information processing apparatus is a tablet device (also called slate PC) including a touch panel (also called touch screen). Examples of tablet devices include tablet PCs, terminals for browsing electronic books, and smart phones.

With table devices, it is common to display a multiple-page electronic document on the screen on a page-by-page basis, and change and display pages one by one with a flick operation (an operation of quickly moving a finger in a flick-like motion on the screen that is a touch panel). This flick operation or the like is, so to speak, a command input by gesture. Of course, an operation using, other than a finger, a pen or the like may be used as well, as long as the operation may be detected. The following description is directed to the case of using a finger.

Figure 3B:
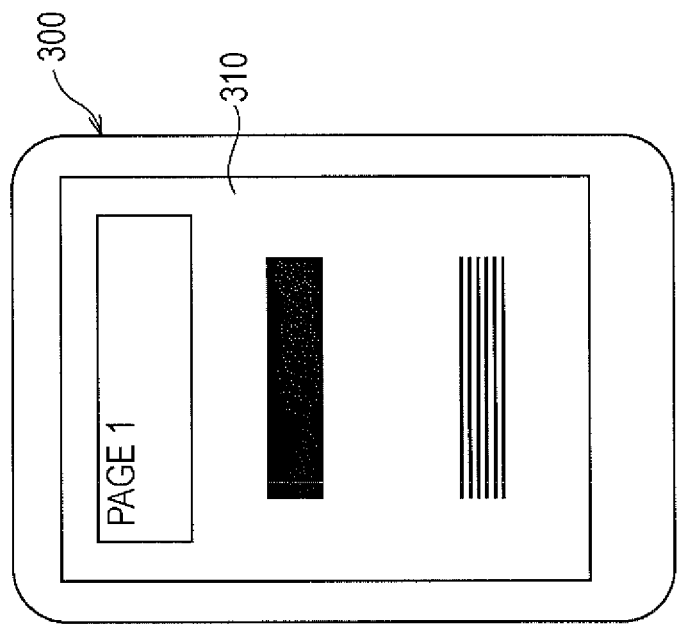
FIGS. 3A and 3B each illustrate an example of a form of an information processing apparatus (tablet device) according to the exemplary embodiment.
Figure 3A:
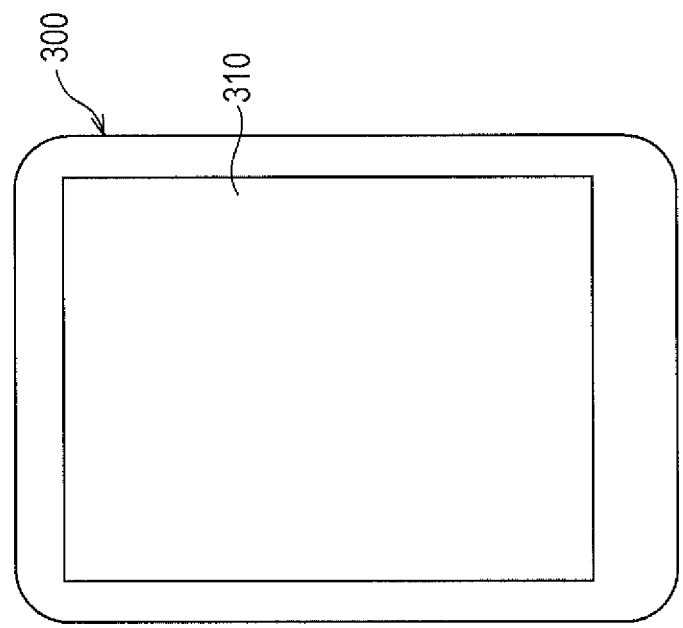
Figure 4A:
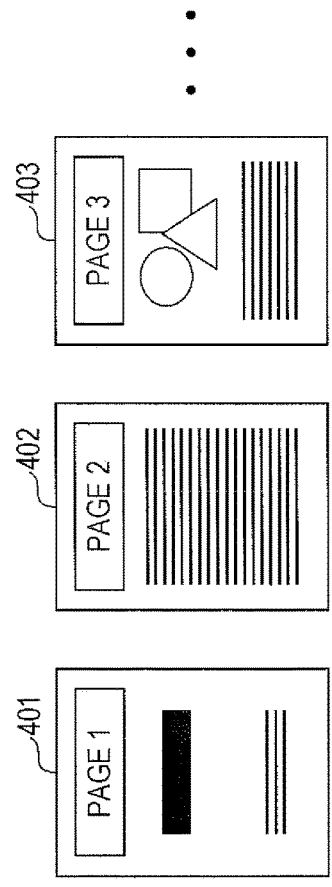
FIGS. 4A and 4B each illustrate an example of an electronic document displayed according to the exemplary embodiment.
Figure 4B:
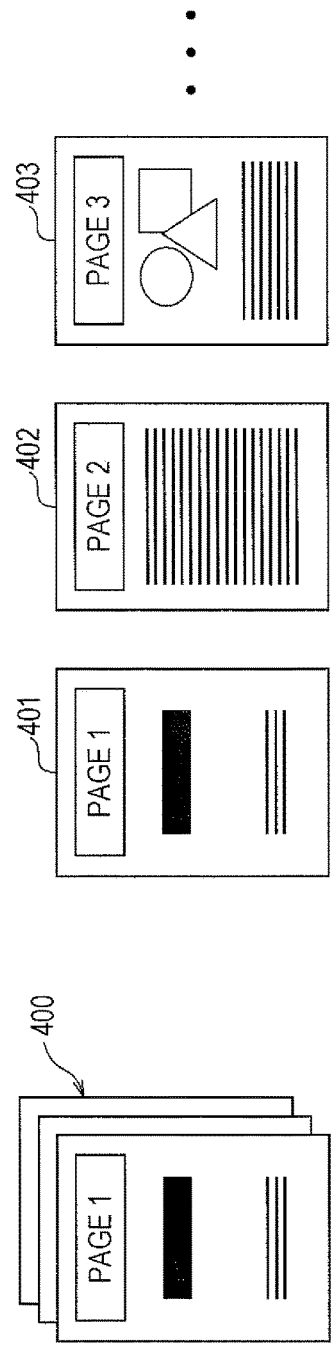

For example, the information processing apparatus according to the exemplary embodiment is in the form of an information processing apparatus (tablet device) 300 as illustrated in FIG. 3A. The information processing apparatus (tablet device) 300 includes a touch panel 310 that functions as a display screen. The information processing apparatus (tablet device) 300 is an information display apparatus (tablet terminal) capable of displaying an electronic document having multiple pages on the touch panel 310 on a page-by-page basis. Of course, the information processing apparatus (tablet device) 300 uses a sensor of the touch panel 310 to detect the motion of a finger touching the touch panel 310. As illustrated in FIG. 3B, when page content is to be displayed on the screen, the content of an electronic document is displayed on the screen on a page-by-page basis. For example, the whole page is displayed on the entire screen to the fullest extent possible. Like an electronic document 400 illustrated in FIG. 4A, the electronic document displayed on the touch panel 310 by the information processing apparatus (tablet device) 300 has multiple pages (see FIG. 4B).

The receiving module 110 is connected to the operation processing module 120. The receiving module 110 receives an operation performed on the screen. That is, the receiving module 110 receives the results of detection of the motion of a finger touching the touch panel 310. Examples of the detection results include, for example, the position (coordinates) of a finger, the number of contact areas with the screen, and the duration of contact. Of course, the receiving module 110 also receives a multi-touch operation.

The operation processing module 120 is connected to the receiving module 110, the single-page turning module 130, the multiple-page adjusting module 142, the multiple-page turning module 150, and the page selecting module 160. The operation processing module 120 determines the type of a received operation on the basis of information received by the receiving module 110, and causes the single-page turning module 130, the multiple-page adjusting module 142, the multiple-page turning module 150, and the page selecting module 160 to execute processing in accordance with the type of operation. Types of operations include a flick, a drag, and a slide. A flick operation refers to an operation such as flicking a finger on the touch panel 310. A flick operation is performed by quickly moving a finger touched on the touch panel 310 across a relatively short distance and then releasing the finger. A drag operation refers to an operation of moving a finger on the touch panel 310 without losing contact. Although similar to a drag operation, a slide operation herein means causing the display of a page of a document to shift to the left or right.

The single-page turning module 130 is connected to the operation processing module 120 and the document page display processing module 180. The single-page turning module 130 turns the currently displayed document one page forward or backward with a flick operation performed in normal conditions, in accordance with the flick direction.

The multiple-page adjusting module 142 is connected to the operation processing module 120, the multiple-page turning module 150, the page selecting module 160, and the document page display processing module 180.

When the page selection mode switching module 144 detects a predetermined first operation on the document displayed on the touch panel 310, the page selection mode switching module 144 changes from a first processing mode (single-page turning mode) which moves one page at a time, to a second processing mode (page selection mode) which moves multiple pages. The expression "move pages" as used herein means to turn pages. As the predetermined first operation, (1) the page selection mode switching module 144 detects continued detection of a first position where a drag operation has ended, or (2) the page selection mode switching module 144 detects, while a first position where a drag operation has ended is detected, a second operation performed at a second position different from the first position. That is, when explained as operator's operation, according to the condition (1) above, the page selection mode is entered by sliding the displayed page with a drag of a finger and maintaining that state without releasing the finger from the screen. The expression "maintaining that state without releasing the finger" means not moving from that position on the screen for a predetermined duration or more. Specifically, when a drag operation is performed to slide the displayed page, and the dragged finger is held down in place to maintain the sliding state of the displayed page, this causes the page selection mode to remain in effect while the sliding state is maintained (the state illustrated in FIG. 8A described later). The condition (2) corresponds to when a drag operation is performed to slide the displayed page, and while that state is maintained without releasing Finger A from the screen, the touch panel 310 is touched with another Finger B. This represents a case where a so-called multi-touch is performed at the end of a drag operation.

Further, the page selection mode switching module 144 may not change to the second processing mode if the amount of movement caused by the first operation is greater than, or greater than equal to, a predetermined value. That is, the single-page turning mode is maintained as it is. This will be described later with reference to FIG. 12.

The page selection amount adjusting module 146 adjusts the amount of pages to move in page selection mode, in accordance with the amount of movement caused by the first operation (to be also referred to as amount of slide hereinafter). The page selection amount adjusting module 146 may also adjust the direction of page movement in page selection mode in accordance with the direction of movement caused by the first operation. Further, the page selection amount adjusting module 146 may adjust the amount of pages to move forward or backward with respect to the page displayed on the touch panel 310. Specifically, the page selection amount adjusting module 146 allows the user to select the number of pages to be turned at once by the multiple-page turning module 150, and the size of the page range that may be selected by the page selecting module 160.

The multiple-page turning module 150 is connected to the operation processing module 120, the multiple-page adjusting module 142, and the document page display processing module 180. If the multiple-page turning module 150 detects a predetermined second operation in page selection mode, the multiple-page turning module 150 moves multiple pages within the electronic document displayed on the touch panel 310. Further, if the multiple-page turning module 150 detects a predetermined second operation in page selection mode, the multiple-page turning module 150 moves the amount of pages adjusted by the page selection amount adjusting module 146, within the electronic document displayed on the touch panel 310. For example, in the case of (1) mentioned above, the second operation is a flick operation performed in page selection mode. In accordance with the direction of this flick operation, multiple pages are turned forward or backward to display a page. In the case of (2) mentioned above, the second operation is a flick operation performed with Finger B in page selection mode (which may not necessarily be performed with Finger B but may be performed with a finger other than Finger B). In accordance with the direction of this flick operation, multiple pages are turned forward or backward to display a page. The number of pages to be turned is determined by the amount of slide.

The page selecting module 160 is connected to the operation processing module 120, the multiple-page adjusting module 142, and the document page display processing module 180. If the page selecting module 160 detects a predetermined third operation in page selection mode, the page selecting module 160 moves pages within the range of the amount of pages adjusted by the page selection amount adjusting module 146. For example, in the case of (1) mentioned above, the third operation is a drag operation performed with a finger different from that used for the operation to transition to the page selection mode. In the case of (2) mentioned above, the third operation is a drag operation performed with Finger B. By performing a drag operation when in page selection mode, the page to be displayed is selected from within the range of preceding and subsequent pages, on the basis of the direction and amount of the drag. The size of the page range is determined by the amount of slide. The document data storage module 170 is connected to the document page display processing module 180. The document data storage module 170 stores an electronic document to be displayed on the touch panel 310. The document data storage module 170 may not necessarily exist within the information processing apparatus (tablet device) 300. The document data storage module 170 may be a document storage device connected to the information processing apparatus (tablet device) 300 via a communication line.

The document page display processing module 180 is connected to the single-page turning module 130, the multiple-page adjusting module 142, the multiple-page turning module 150, the page selecting module 160, the document data storage module 170, and the display module 190. The document page display processing module 180 reads a page to be displayed from the electronic document stored in the document data storage module 170, on the basis of an instruction from the single-page turning module 130 or the multiple-page processing module 140, and passes the page to the display module 190.

The display module 190 is connected to the document page display processing module 180. The display module 190 displays a multiple-page document on the touch panel 310 on a page-by-page basis. Specifically, the display module 190 displays the content of the page passed from the document page display processing module 180 on the touch panel 310.

A conceptual overview of processing according to the exemplary embodiment is described below.

Figure 5:
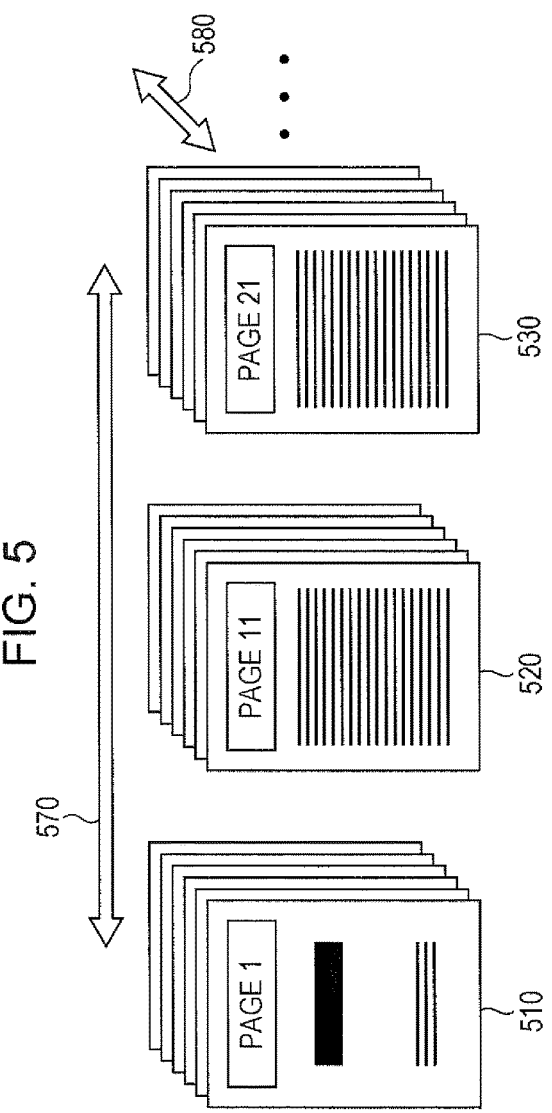
FIG. 5 illustrates an example of processing according to the exemplary embodiment.

As illustrated in FIG. 5, the information processing apparatus according to the exemplary embodiment divides an electronic document into units (blocks) of a predetermined number of pages, allowing a page to be selected faster than by turning pages one by one. For example, suppose that the electronic document 400 is divided into an electronic document (first block) 510, an electronic document (second block) 520, an electronic document (third block) 530, and so on. How to adjust the amount of pages in each divided block will be described later. First, by performing block selection 570, a page desired by the operator is roughly selected from the entire electronic document on a block-by-block basis. That is, a block including the page is selected. Then, by performing page selection 580, after moving closer to the page desired by the operator within the selected block, the desired page is selected within the limited range (block). The multiple-page turning module 150 performs processing corresponding to the block selection 570. The page selecting module 160 performs processing corresponding to the page selection 580.

Figure 6:
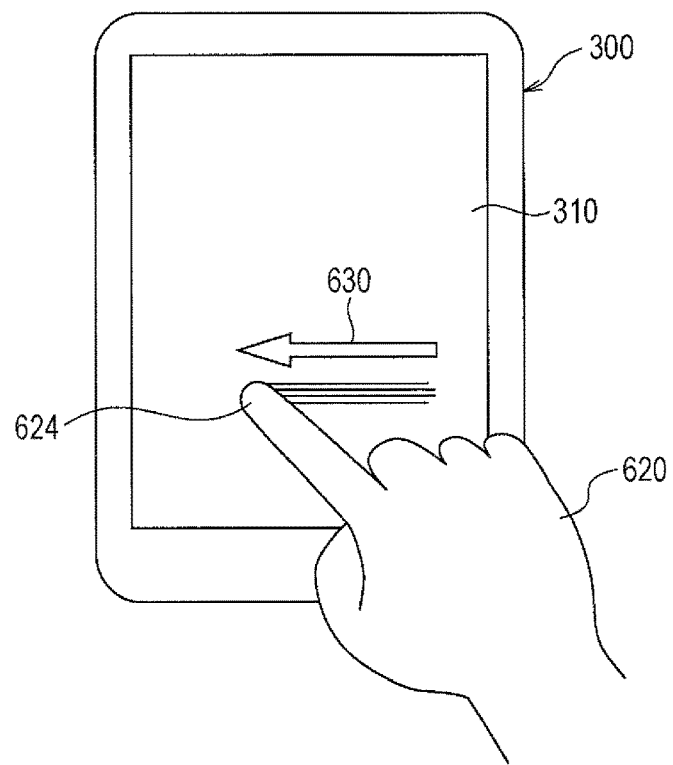
FIG. 6 illustrates an example of processing according to the exemplary embodiment.

Next, a drag operation (or slide operation) performed for display of an electronic document will be described with reference to FIGS. 6 to 7B.

A drag operation refers to an operation of moving a finger without losing contact with the screen. As illustrated in FIG. 6, for example, an index finger 624 of a hand 620 is touched to the touch panel 310, and the index finger 624 is moved in a direction of movement 630 without breaking contact with the touch panel 310.

Figure 7A:
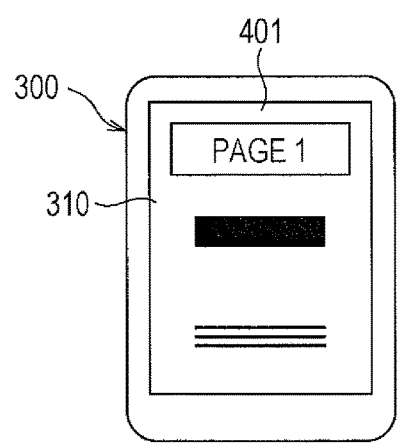
FIGS. 7A and 7B each illustrate an example of processing according to the exemplary embodiment.

As the index finger 624 is moved to the left or right, the displayed page is shifted, and an overlap of pages is displayed in the margin area created. Specifically, if the index finger 624 is moved to the left while an electronic document (page 1) 401 is displayed on the touch panel 310 of the information processing apparatus (tablet device) 300 as illustrated in FIG. 7A, as illustrated in FIG. 7B, the display of the electronic document (page 1) 401 is shifted to the left, and a page overlap display region 710 is displayed in the area to the right within the touch panel 310.

At this time, sliding a predetermined distance or more may, upon releasing the finger, turn a page to display the next page. With this configuration, a drag operation means being in the middle of page turning. Consequently, as will be described later, an operation performed during the sliding state means a page selection operation performed in the middle of page turning.

FIGS. 2A and 2B are flowcharts illustrating an example of processing according to the exemplary embodiment.

In step S202, the operation processing module 120 determines whether the current operation is a flick operation. If the current operation is a flick operation, the processing proceeds to step S204. Otherwise, the processing proceeds to step S206.

In step S204, the single-page turning module 130 advances or goes back one page in the direction of page turning based on the flick direction. That is, as in related art, it is possible to turn pages one by one with a flick operation.

In step S206, the operation processing module 120 determines whether the current operation is a drag operation. If the current operation is a drag operation, the processing proceeds to step S208. Otherwise, the processing returns to step S202.

In step S208, the document page display processing module 180 slides the displayed page in accordance with the direction and amount of the drag.

In step S210, the operation processing module 120 determines whether the finger has been released (no touch). If the finger has been released, the processing proceeds to step S212. Otherwise, the processing proceeds to step S218.

In step S212, it is determined whether the amount of slide of the current page is greater than a threshold. If the amount of slide of the current page is greater than a threshold, the processing proceeds to step S216. Otherwise, the processing proceeds to step S214.

In step S214, the document page display processing module 180 resets the slide, and displays the current page as originally displayed.

In step S216, the single-page turning module 130 advances or goes back one page in the direction of page turning based on the slide direction. That is, the displayed page is caused to slide over by drag. If, upon releasing the finger after sliding, the amount of the slide is greater than a threshold, this allows a page to be turned.

In step S218, the page selection mode switching module 144 switches to the page selection mode.

In step S220, the operation processing module 120 determines whether a second finger has touched. If a second finger has touched, the processing proceeds to step S224. Otherwise, the processing proceeds to step S222. By touching with one more finger during sliding to perform two-finger touching, it is possible to turn multiple pages.

In step S222, the page selection mode switching module 144 exits the page selection mode.

In step S224, the page selection amount adjusting module 146 determines the size w of a page selection range in accordance with the amount of slide. The page selection amount adjusting module 146 sets the initial page selection range (p1, p2), with the currently displayed page p in the middle. For example, p1 and p2 are set as follows: p1=p−w/2, and p2=p+w/2. The initial value of a destination page q is set to p. The amount of pages to be turned once, or the size of the page selection range is determined by the amount of slide.

In step S226, the operation processing module 120 determines whether the current operation is a flick (with one of the two fingers). If the current operation is a flick, the processing proceeds to step S228. Otherwise, the processing proceeds to step S230. That is, a flick operation with one of the two touching fingers turns a number of pages corresponding to the amount of slide at once in the flick direction.

In step S228, the multiple-page turning module 150 moves an amount of pages corresponding to the size w of the page selection range in the flick direction, and displays the resulting page. p+w is substituted into the variable p.

In step S230, the operation processing module 120 determines whether the current operation is a drag (with one of the two fingers). If the current operation is a drag, the processing proceeds to step S232. Otherwise, the processing proceeds to step S234. When a drag operation is performed with one of the two touching fingers, a destination page is selected in accordance with the direction and amount of the drag operation, within a range of pages based on the amount of slide, with the currently displayed page in the middle. The dragged finger is released to move to the selected page.

In step S232, the page selection amount adjusting module 146 selects a destination page within the current page selection range (p1, p2) in accordance with the amount of drag, and updates q.

In step S234, the operation processing module 120 determines whether the finger has been released (whether one of the two fingers has been released). The processing proceeds to step S236 if the finger has been released. Otherwise, the processing proceeds to step S226.

In step S236, the page selecting module 160 moves to and displays the selected page q. q is substituted into the variable p.

Figure 8A:
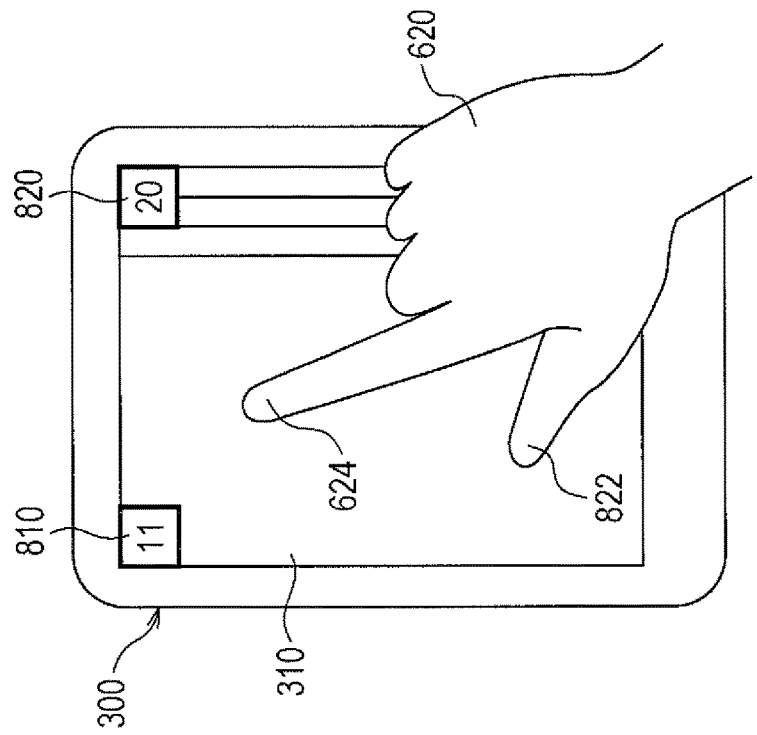
FIGS. 8A and 8B each illustrate an example of processing according to the exemplary embodiment.
Figure 8B:
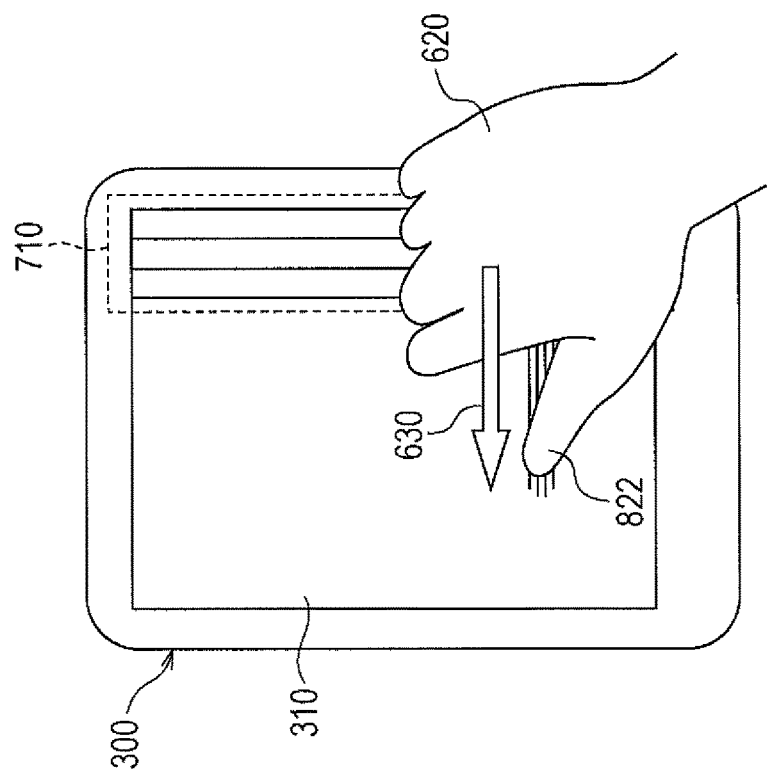

FIGS. 8A and 8B each illustrate an example of processing (switching to the page selection mode) according to the exemplary embodiment.

Figure 7B:
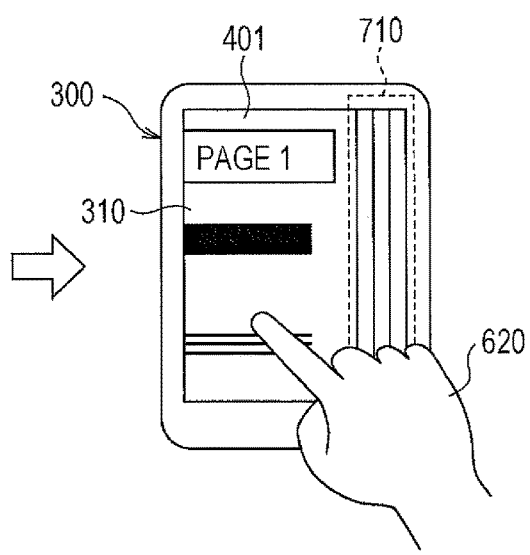

As in FIG. 7B, FIG. 8A illustrates a sliding state. A drag operation is performed to slide the displayed page, and the sliding state is maintained without releasing a thumb 822 from the touch panel 310. Because operating with the thumb 822 makes subsequent operation easier, the above example illustrates a case where the thumb 822, rather than the index finger 624, is used to slide the displayed page in the direction of movement 630. Of course, the two fingers may not be the thumb 822 and the index finger 624, and may not be fingers on the right hand.

In the example illustrated in FIG. 8B, switching to the page selection mode occurs if the state illustrated in FIG. 8A continues, that is, if it is detected that the thumb 822 is no longer moving from the position where movement of the drag operation has ended, or if, while the position where the drag operation has ended is detected, an operation (a touch on the touch panel 310 with the index finger 624) performed at a position different from that position is detected.

To indicate the switching to the page selection mode, a page selection range (left-edge page number display) 810, and a page selection range (right-edge page number display) 820 are displayed. While the page selection range (left-edge page number display) 810 and the page selection range (right-edge page number display) 820 are located at the upper left-hand and right-hand sides of the touch panel 310, respectively, the page selection range (left-edge page number display) 810 and the page selection range (right-edge page number display) 820 may be located at the lower left-hand and right-hand sides of the touch panel 310, respectively.

The page selection range is displayed within the page selection range (left-edge page number display) 810 and the page selection range (right-edge page number display) 820, with the currently displayed page in the middle. The page selection range is determined by the distance the thumb 822 is moved while keeping on touching the touch panel 310 (the amount of slide, or the width of the page overlap display region 710). In the current example, page 15 is displayed on the touch panel 310, each block is set to 10 pages, and the pages at the beginning and end of the block are displayed as (page) "11" in the page selection range (left-edge page number display) 810 and as (page) "20" in the page selection range (right-edge page number display) 820.

In this state, that is, while the slid thumb 822 is held down in place, a page is selected with a flick operation or drag operation of the index finger 624.

Figure 9:
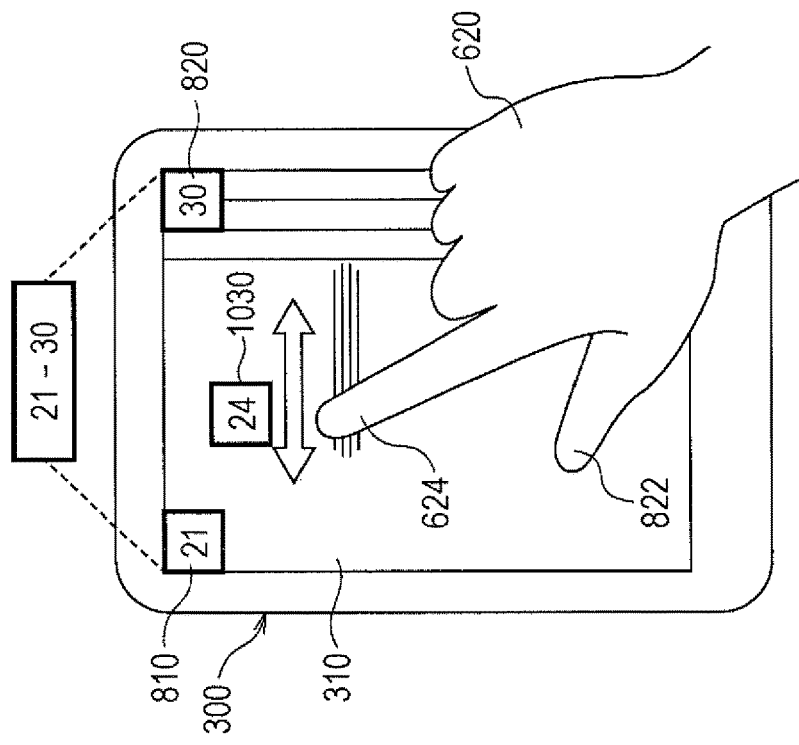
FIG. 9 illustrates an example of processing according to the exemplary embodiment.

FIG. 9 illustrates an example of processing according to the exemplary embodiment. FIG. 9 illustrates an example of a flick operation with the index finger 624 performed after switching to the page selection mode.

When this flick operation is detected, multiple-page turning is performed. In this case, page movement is on a page selection range basis (in block units).

As a specific operation, while the slid thumb 822 is held down in place, the index finger 624 is flicked to the left, for example. When this operation is detected, pages corresponding to the page selection range are turned at once. Specifically, this causes the display to move from the state in FIG. 8B (the state of a block (p.11 to 20) 910) to the state of a block (p.21 to 30) 920. Page 25 is now displayed on the touch panel 310 as a result of advancing 10 pages from page 15. The display of the page selection range (left-edge page number display) 810 changes to (page) "21", and the display of the page selection range (right-edge page number display) 820 changes to (page) "30." Flicking further to the left results in the state of a block (p.31 to 40) 930, and flicking to the right returns to the state of the block (p.11 to 20) 910.

Figure 10:
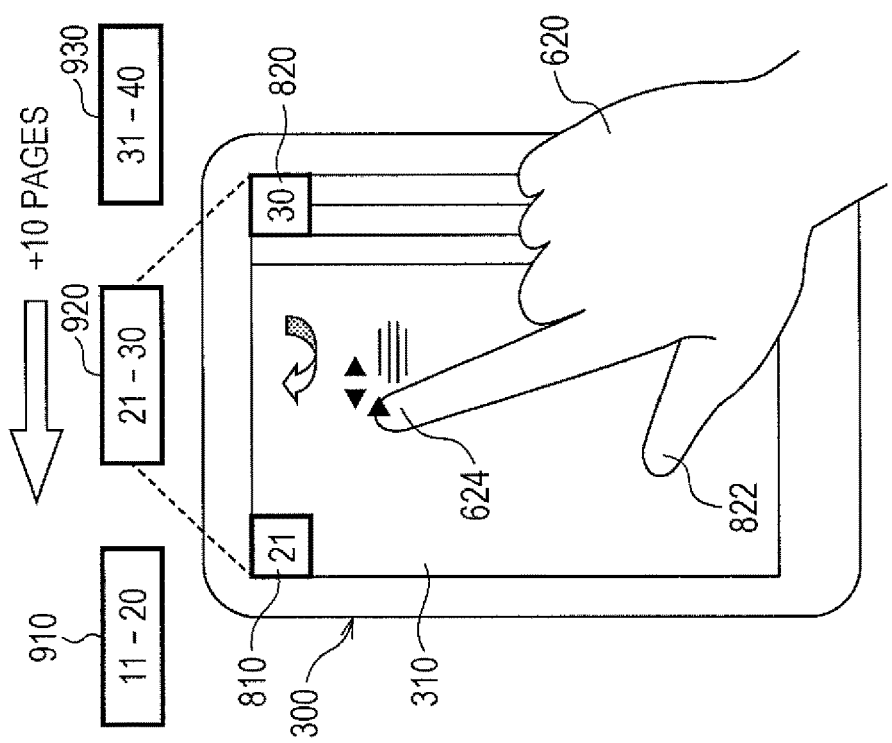
FIG. 10 illustrates an example of processing according to the exemplary embodiment.

FIG. 10 illustrates an example of processing according to the exemplary embodiment. FIG. 10 illustrates an example of a drag operation with the index finger 624 performed after switching to the page selection mode. It is assumed that a drag operation is performed in the state illustrated in FIG. 9, that is, in the state of the block (p.21 to 30) 920.

When this drag operation is detected, pages are turned within the page selection range (block unit). In this case, the page to be displayed is selected within the block (p.21 to 30) 920.

As a specific operation, while the slid thumb 822 is held down in place, the index finger 624 is dragged to the left, for example. When this operation is detected, a page is selected within a page selection range. Then, the page being currently selected is displayed in a currently selected page display (within the range of p.21 to 30) 1030. Because this is a left drag operation, the display is changed from page 25 to page 24. Of course, the content of the changed page may be displayed on the touch panel 310. While in FIG. 10 the currently selected page display 1030 is located above the position being dragged over, the currently selected page display 1030 may be located elsewhere.

FIGS. 11A and 11B each illustrate an example of processing according to the exemplary embodiment. This example illustrates how the size of the page selection range is adjusted on the basis of the amount of slide (the amount of movement of the thumb 822), while a slide operation (which may include a drag operation) is performed to switch to the page selection mode.

Making the amount of slide smaller causes the block to become smaller, resulting in a smaller amount of pages turned by a flick operation. Further, the range of pages selected by a drag operation becomes smaller.

Making the amount of slide larger causes the block to become larger, resulting in a larger amount of pages turned by a flick operation. Further, the range of pages selected by a drag operation becomes larger.

The relationship between the amount of slide and the size of the page selection range may be made to vary with the total number of pages in a document.

FIG. 11A illustrates a case with a small selection range size. If a width of movement 1110 of the thumb 822 is small, a small number of pages are turned at once with a flick operation of the index finger 624. For example, "30" is displayed in the page selection range (right-edge page number display) 820.

FIG. 11B illustrates a case with a small selection range size. If a width of movement 1120 of the thumb 822 is large, a large number of pages are turned at once with a flick operation of the index finger 624. For example, "50" is displayed in the page selection range (right-edge page number display) 820.

Figure 12B:
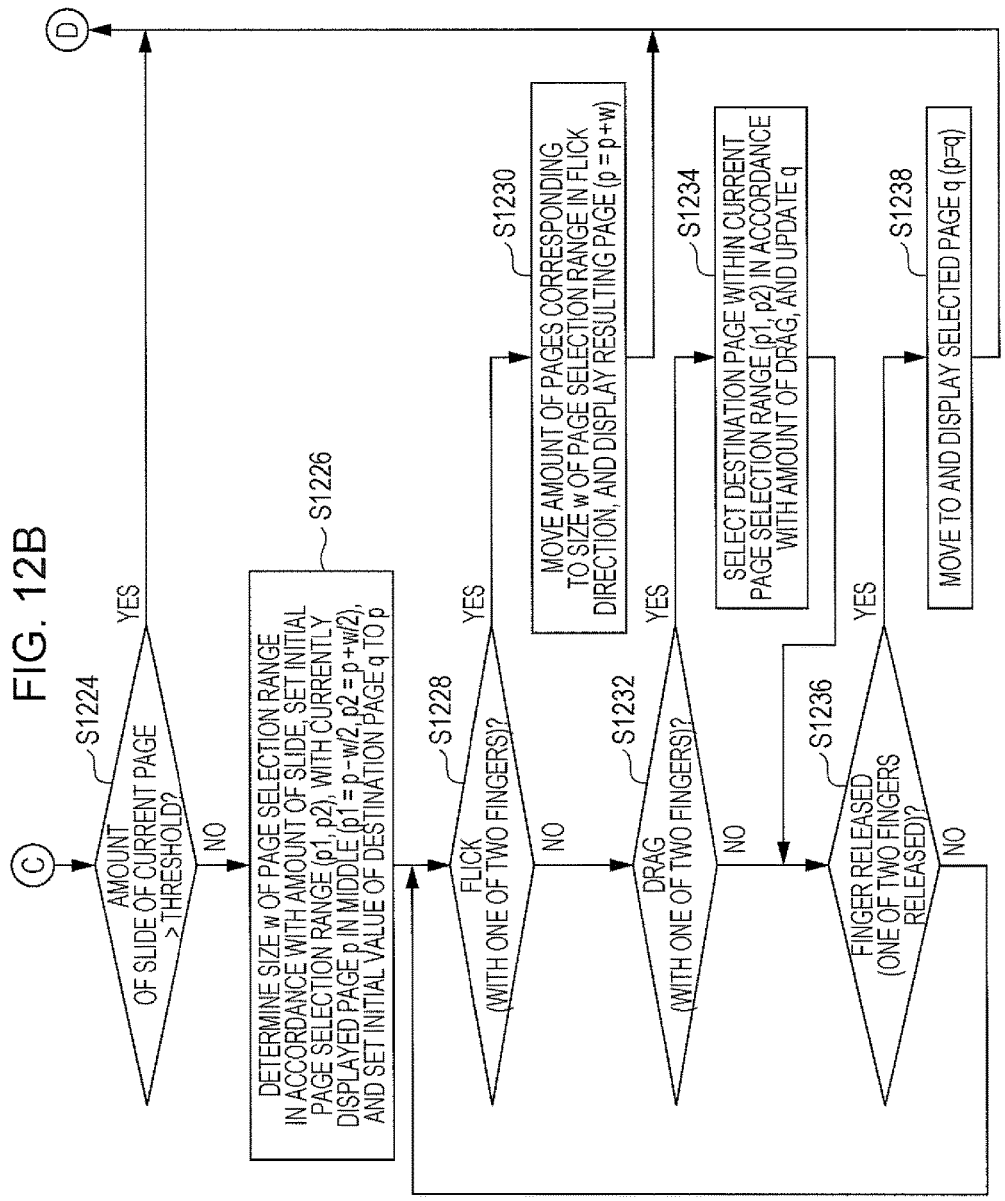

FIGS. 12A and 12B are flowcharts illustrating an example of processing according to the exemplary embodiment.

The flowcharts illustrated in FIGS. 12A and 12B have step S1224 added to the flowcharts illustrated in FIGS. 2A and 2B.

In step S1224, the page selection amount adjusting module 146 determines whether the amount of slide of the current page is greater than a threshold. If the amount of slide of the current page is greater than a threshold, the processing returns to step S1210. Otherwise, the processing proceeds to step S1226. That is, no change to the page selection mode occurs if the amount of drag is greater than a threshold.

The following processing may be performed upon detecting that a first finger (the thumb 822) is dragged multiple times while a second finger (the index finger 624) is touched on the touch panel 310.

The following series of operations is performed two or more times. That is, while keeping the index finger 624 motionless (touching) in the state illustrated in FIG. 8B, the thumb 822 is touched to the touch panel 310 in the manner as illustrated FIG. 8A, moved while keeping on touching the touch panel 310, and then lifted up. This causes the page selection range to increase or decrease by an amount greater than or equal to that accomplished by a single drag operation of the thumb 822.

The width in the direction of movement 630 of the first drag and the width in the direction of movement 630 of the second drag are summed (the same applies if the drag is to be performed for the third or subsequent times) to compute the amount of slide. Further, an addition or subtraction is performed by taking the direction of movement of the thumb 822 into account. That is, an addition is performed if the direction of the second drag is the same as the direction of the first drag, and a subtraction is performed if the direction of the second drag is opposite to the direction of the first drag (the same applies if the drag is to be performed for the third or subsequent times).

Figure 13:
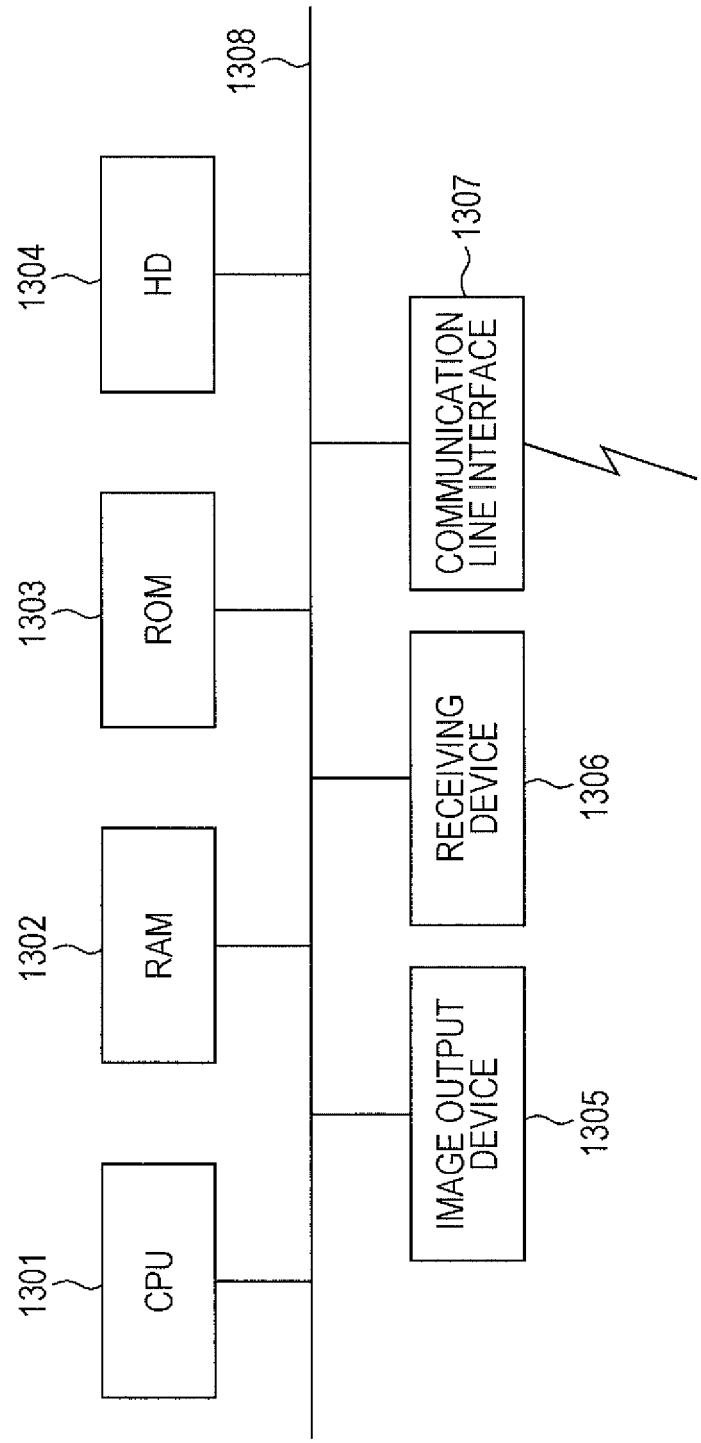
FIG. 13 is a block diagram illustrating an example of hardware configuration of a computer that implements the exemplary embodiment.

The hardware configuration of a computer on which the program according to the exemplary embodiment is executed is that of a general computer as illustrated in FIG. 13, specifically, a computer or the like that may serve as a personal computer or a server. That is, as a specific example, a CPU 1301 is used as a processing unit (arithmetic unit), and a RAM 1302, a ROM 1303, and a HD 1304 are used as memories. For example, a hard disk or a flash memory may be used as the HD 1304. The computer is made up of: the CPU 1301 that executes a program for implementing modules such as the receiving module 110, the operation processing module 120, the single-page turning module 130, the page selection mode switching module 144, the page selection amount adjusting module 146, the multiple-page turning module 150, the page selecting module 160, the document data storage module 170, the document page display processing module 180, and the display module 190; the RAM 1302 that stores the program and data; the ROM 1303 in which a program for booting the computer, and the like are stored; the HD 1304 that serves as an auxiliary memory that stores a document and the like; a receiving device 1306 that receives data on the basis of a user's operation on a touch panel or the like; an image output device 1305 such as a liquid crystal display that is a touch panel; a communication line interface 1307 for establishing a connection with a communication network, such as a network interface card; and a bus 1308 that interconnects the above-mentioned components to exchange data. Multiple such computers may be connected to each another via a network.

For features based on a computer program in the foregoing exemplary embodiment, a system having the above-mentioned hardware configuration is caused to read the computer program as software, and as the software cooperates with hardware resources, the foregoing exemplary embodiment is implemented.

The hardware configuration depicted in FIG. 13 is only illustrative. The exemplary embodiment is not limited to the configuration illustrated in FIG. 13 as long as the modules described in the exemplary embodiment may be executed. For example, some modules may be implemented by dedicated hardware (such as an ASIC), and some modules may be provided within an external system and may be connected via a communication line. Further, multiple systems configured as illustrated in FIG. 13 may be connected to each another by a communication line so as to operate in cooperation with each other.

In the foregoing exemplary embodiment, words or phrases that mean "greater than or equal to", "less than or equal to", "greater than", and "less than", or their equivalents used when making comparisons with predetermined values may be read as "greater than", "less than", "greater than or equal to", and "less than or equal to", respectively, as long as consistency is maintained in the respective combinations.

The program described herein may be provided in the form of being stored in a recording medium, or the program may be provided via a communication unit. In that case, for example, the above-mentioned program may be understood as an invention relating to a "computer readable recording medium recording a program."

The "computer readable recording medium recording a program" refers to a computer readable recording medium on which a program is recorded and which is used for purposes such as installing, executing, and distributing the program.

Examples of the recording medium include digital versatile discs (DVDs), such as "DVD-R, DVD-RW, DVD-RAM, and the like", which are standards developed by the DVD Forum, and "DVD+R, DVD+RW, and the like", which are standards developed by the DVD+RW alliance, compact discs (CDs) such as read-only memory (CD-ROM), CD-Recordable (CD-R), and CD-Rewritable (CD-RW) discs, Blu-ray (registered trademark) discs, magneto-optical discs (MOs), flexible disks (FDs), magnetic tapes, hard disks, read-only memories (ROMs), electrically erasable programmable read-only memories (EEPROMs (registered trademark)), flash memories, random access memories (RAMs), and Secure Digital (SD) memory cards.

The above-mentioned program or a portion thereof may be recorded on the above-mentioned recording medium for purposes such as saving and distribution. Alternatively, the program may be transmitted by communication via a transmission medium such as a wired network or a wireless communication network which is used for a local area network (LAN), a metropolitan area network (MAN), a wide area network (WAN), the Internet, an intranet, an extranet, and the like, or a combination thereof, or may be carried on a carrier wave.

Further, the program mentioned above may be part of another program, or may be recorded on a recording medium together with a different program. Alternatively, the program may be recorded separately on multiple recording media. Furthermore, the program may be recorded in any form, such as compressed or encrypted, as long as the program may be restored.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An apparatus comprising:
a screen operable to display pages and to receive input;
a hardware processor programmed to:
 display a document having plural pages on the screen;
 receive, from the screen, signals corresponding to the input;
 detect whether the signals correspond to a flick gesture or a switching gesture on the screen, wherein the flick gesture and the switching gesture are different from each other, the switching gesture comprises a longer motion across the screen than the flick gesture, and the flick gesture and the switching gesture are independent of content displayed on the screen;
 turn at least one page of the document in response to detecting a flick gesture;
 change, in response to detecting the switching gesture and according to a distance of the motion of the switching gesture, a quantity of pages to be turned by each subsequently detected flick gesture; and
 maintain the changed quantity of pages through multiple detected flick gestures when at least a part of the switching gesture is detected as being maintained during the subsequently detected flick gesture.

2. The information processing apparatus according to claim 1, wherein the switching gesture switches page turning modes including first and second page turning modes so that the switching gesture is a mode changing gesture,
wherein the processor is further programmed to change the page turning mode from the first page turning mode to the second page turning mode upon detecting of the mode changing gesture, and wherein
in the first page turning mode, one page of the document is turned in response to the flick, and
in the second page turning mode, plural pages of the document are turned in response to the flick.

3. The information processing apparatus according to claim 2, wherein:
the switching gesture is a dragging gesture performed on the screen; and the quantity of pages of the document to be turned in response to the detecting of the flick is determined according to the distance traversed by the dragging gesture.

4. The information processing apparatus according to claim 3, wherein the processor is further programmed to display on the screen the quantity of pages to be turned in response to the detecting of the flick in the second page turning mode.

5. The information processing apparatus according to claim 2, wherein the switching gesture is a dragging gesture and the processor is further programmed to:
   detect the dragging gesture on the screen; and
   perform different operations in response to the detecting of the dragging gesture, depending on the page turning mode operating during the dragging gesture.

6. The information processing apparatus according to claim 5,
   wherein the quantity of pages to be turned by the flick defines a page selection range within which pages are turned one at a time with the dragging gesture, and
   wherein the processor is further programmed to:
      change the page turning mode from the first page turning mode to the second page turning mode in response to the detecting of the dragging gesture when the page turning mode at the start of the dragging gesture is the first page turning mode; and
      turn a page within the page selection range in response to the dragging gesture when the page turning mode at the start of the dragging gesture is the second page turning mode.

7. A non-transitory computer readable medium storing a program causing a hardware processor of a computer to execute a process comprising:
   displaying a document having plural pages on a screen operable to display pages and to receive input;
   receiving, from the screen, signals corresponding to input from the user;
   detecting whether the signals correspond to a flick gesture or a switching gesture performed by the user on the screen, wherein the flick gesture and the switching gesture are different from each other, the switching gesture comprises a longer motion across the screen by the user than the flick gesture, and the flick gesture and the switching gesture are independent of content displayed on the screen;
   turning at least one page of the document in response to detecting a flick gesture;
   changing, in response to detecting the switching gesture and according to a distance of the motion of the switching gesture, a quantity of pages to be turned by each subsequently detected flick gesture; and
   maintain the changed quantity of pages through multiple detected flick gestures when at least a part of the switching gesture is detected as being maintained during the subsequently detected flick gesture.

8. A method comprising the steps, performed by a hardware processor, of:
   displaying a document having plural pages on a screen operable to display pages and to receive input from a user;
   receiving, from the screen, signals corresponding to input from the user;
   detecting whether the signals correspond to a flick gesture or a switching gesture performed by the user on the screen, wherein the flick gesture and the switching gesture are different from each other, the switching gesture comprises a longer motion across the screen by the user than the flick gesture, and the flick gesture and the switching gesture are independent of content displayed on the screen;
   turning at least one page of the document in response to detecting a flick gesture;
   changing, in response to detecting the switching gesture and according to a distance of the motion of the switching gesture, a quantity of pages to be turned by each subsequently detected flick gesture; and
   maintaining the changed quantity of pages through multiple detected flick gestures when at least a part of the switching gesture is detected as being maintained during the subsequently detected flick gesture.

9. An apparatus comprising:
   a screen operable to display pages and to receive input;
   a hardware processor programmed to:
      display a document having plural pages on the screen;
      receive, from the screen, signals corresponding to the input;
      detect whether the signals correspond to a flick gesture or a switching gesture on the screen, wherein the flick gesture and the switching gesture are different from each other, the switching gesture comprises a longer motion across the screen than the flick gesture, and the flick gesture and the switching gesture are independent of content displayed on the screen;
      turn at least one page of the document in response to detecting a flick gesture;
      determine whether to change a quantity of pages to be turned by each subsequently detected flick gesture in response to detecting the switching gesture and according to a distance of the motion of the switching gesture; and
      maintain the changed quantity of pages through multiple detected flick gestures when at least a part of the switching gesture is detected as being maintained during the subsequently detected flick gesture.

* * * * *